US007380002B2

(12) United States Patent
House et al.

(10) Patent No.: US 7,380,002 B2
(45) Date of Patent: *May 27, 2008

(54) BI-DIRECTIONAL AFFINITY WITHIN A LOAD-BALANCING MULTI-NODE NETWORK INTERFACE

(75) Inventors: Sean B. House, Redmond, WA (US); Joseph Joy, Redmond, WA (US); Rajesh Dadhia, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 938 days.

This patent is subject to a terminal disclaimer.

(21) Appl. No.: 10/186,899

(22) Filed: Jun. 28, 2002

(65) Prior Publication Data

US 2004/0003099 A1    Jan. 1, 2004

(51) Int. Cl.
*G06F 15/173* (2006.01)
(52) U.S. Cl. .................. 709/226; 709/203; 709/223; 709/226; 709/227; 718/105
(58) Field of Classification Search ................ 709/203, 709/226, 229, 217, 223, 227; 718/105, 104
See application file for complete search history.

(56) References Cited

U.S. PATENT DOCUMENTS

| 6,067,545 | A | 5/2000 | Wolff | |
|---|---|---|---|---|
| 6,078,943 | A | 6/2000 | Yu | |
| 6,119,143 | A | 9/2000 | Dias et al. | |
| 6,185,601 | B1 | 2/2001 | Wolff | |
| 6,289,369 | B1* | 9/2001 | Sundaresan | 718/105 |
| 6,351,775 | B1 | 2/2002 | Yu | |
| 6,424,992 | B2* | 7/2002 | Devarakonda et al. | 709/226 |
| 6,571,288 | B1 | 5/2003 | Sarukkai | |
| 6,587,866 | B1* | 7/2003 | Modi et al. | 718/105 |
| 6,671,259 | B1* | 12/2003 | He et al. | 709/229 |
| 6,748,413 | B1 | 6/2004 | Bournas | |
| 6,748,414 | B1 | 6/2004 | Bournas | |
| 6,779,016 | B1* | 8/2004 | Aziz et al. | 718/105 |
| 6,871,347 | B2* | 3/2005 | Hay | 718/105 |
| 6,920,485 | B2* | 7/2005 | Russell | 709/217 |
| 7,047,315 | B1* | 5/2006 | Srivastava | 709/236 |
| 2004/0205250 | A1* | 10/2004 | Bain et al. | 718/105 |
| 2006/0233106 | A1* | 10/2006 | Achlioptas et al. | 370/235 |

OTHER PUBLICATIONS

Haldar et al., "An Affinity-based Dynamic Load Balancing Protocol for Distributed Transaction Processing Systems", 1993, Performance Evaluation 17(1): pp. 53-71.*

(Continued)

*Primary Examiner*—Ario Etienne
*Assistant Examiner*—Ramy M Osman

(57) ABSTRACT

A new network load balancing/firewall node for use in a system including multiple network load balancing/firewall nodes is disclosed. The network load balancing/firewall applies bi-directional load balancing affinity with regard to requests from external clients and corresponding responses from internal network servers. An external network load balancing adapter executes a load-balancing algorithm to determine whether a received client request is accepted by the network load balancing/firewall node. A firewall utility processes the received client request and maintains state information associated with the received client request. An internal network load balancing adapter ensures that the same network load balancing/firewall node accepts a response from an internal network server corresponding to the received client request.

16 Claims, 12 Drawing Sheets

OTHER PUBLICATIONS

Rivest, R. "MD5 Message Digest Algorithm", RFC 1321, Apr. 1992.*

U.S. Appl. No. 10/184,870, filed Jun. 28, 2002, Parham et al.

H. Bryhni et al. *A Comparison of Load Balancing Techniques for Scalable Web Servers*. IEEE Network, vol. 14, No. 4, pp. 58-64 (2000).

A. Fox et al. *Cluster-Based Scalable Network Services*. Proceedings of 16th ACM Symposium on Operating Systems Principles, pp. 78-91 (1997).

M. Karaul et al. *WebSeAl: Web Server Allocation*. Technical Report TR1997-752, Department of Computer Science, New York University (Dec. 1997).

B. Narendran et al. *Data Distribution Algorithms for Load Balanced Fault-Tolerant Web Access*. Proceedings of 16th Symposium on Reliable Distributed Systems, pp. 97-106 (IEEE, 1997).

* cited by examiner

BI-DIRECTIONAL AFFINITY WITHIN A LOAD-BALANCING MULTI-NODE NETWORK INTERFACE

AREA OF THE INVENTION

The present invention generally relates to the area of computer networks and implementation of load balancing within such networks. More particularly, the present invention is directed to load balancing in connection with multi-node network interfaces interposed between external clients and servers on an internal network.

BACKGROUND OF THE INVENTION

More and more today computer end users are reaching out over the Internet to gather information and news located at remote servers. Often, in order to meet user demand, the requested information resides on multiple servers working in concert to fulfill information requests. Allowing multiple users to access the same data servers and execute the same application requires sophisticated network management capable of ensuring that servers are reliable, highly available and scalable. One of the more challenging aspects of network management is balancing server load in order to handle overwhelming demand for access to Internet locales.

"Load balancing" is the term given to a technique for apportioning the work of serving a network task, function, application etc. among two or more servers (also referred to as "hosts"). According to the technique, a number of servers are grouped in a "cluster" such that client requests are distributed amongst the servers in the cluster ensuring that no one server becomes overloaded. For example, load balancing is especially important for networks where it is difficult to predict the number of requests that will be issued to any given server, such as a high-traffic website host.

One common approach to load balancing is referred to as the "round-robin" approach. Under this method, application requests are evenly distributed amongst servers in a cluster such that each server gets an equal share of the load. The round-robin approach, however, has limitations such as not taking into consideration the different performance characteristics of individual servers in the cluster and not determining whether the designated server is actually available. Consequently, it is possible to overload a slower server in the cluster or send a request to a server that is not available.

Other approaches to load balancing require the use of dedicated hardware utilized solely for the purpose of load balancing. For example, dedicated computers executing only load-balancing applications are used to accept connections on behalf of all servers in a cluster, monitor the cluster and assign application requests to servers in the cluster on the basis of performance and availability. Another hardware example is the use of network switches to create a cluster of servers and to divide traffic amongst the available servers in the cluster. A dedicated hardware solution, however, is problematic because it presents a single point of failure for the system such that if the computer or switch fails, the cluster of servers also fails.

An alternative to dedicated hardware, and a solution to the overhead expenses and hardware failure, is software-based load balancing. An example of a software-based solution is the MICROSOFT NETWORK LOAD BALANCING server, also referred to as the "NLB." Microsoft's NLB executes as a network driver on all servers in the cluster. The NLB drivers executing concurrently on each server communicate with each other to monitor the availability of each server and to determine mutually which server in the cluster handles the application request.

An example of a typical implementation of load balancing in the prior art is illustrated in FIG. 1. Networked computer system 100 includes one or more external client computers 110 connected via data links 115 and Internet 120 to a cluster of external network interface servers 130. The cluster of external network interface servers 130 is connected to a series of published servers 150 via data links 135 and 155 and a router 140. With continued reference to FIG. 1, when the external client 110, having IP Address A, makes a connection to one of the internal published servers 150, a data request message 117 is routed to server cluster 130, having IP Address B. Upon receipt, server cluster 130 executes a server selection algorithm based upon the source and destination IP addresses and then one of the servers in the cluster 130 accepts data request message 117. Following message path 1 in the example of FIG. 1, data request message 117 arrives at Server M as a result of executing the selection algorithm using IP Address A and IP Address B.

Server M then makes a connection to the appropriate published server 150 by translating the IP address of public Server M to the private IP address of the published server. In this example, the IP address of Server M identified in data request message 137 translates to IP Address C. In this instance, data request message 137 follows message path 2 from Server M to Published Server N. When constructing a response message, Published Server N swaps the source and destination IP addresses in the response message. In the above example, the source IP address changes from IP Address A to IP Address C and the destination IP address changes from IP Address C to IP Address A. Thereafter, data response message 157 is routed back to server cluster 130, the predefined default gateway for published servers 150. Because the destination address of the response message is unknown to the published server, all response messages from published servers 150 are forwarded to the MAC (i.e., Media Access Control) address of the predefined default gateway, which in this example is the MAC address of server cluster 130.

Upon arrival, server cluster 130 executes a server selection algorithm based on the source and destination addresses. In this scenario, the response message may be sent to a server different than the server that processed the client data request 117 and initiated the connection with the published server. Following message path 3 in the example of FIG. 1, data response message 157 arrives at Server 2 as a result of executing the selection algorithm.

Under the above known load-balancing scheme, the server cluster determines which server processes the message by repeatedly executing the selection algorithm using the source and destination IP addresses. Thus, the return path through the external network interface is not ensured to be the same as the original path from the external client into the external network interface.

SUMMARY OF THE INVENTION

The present invention comprises a new method and structure for implementing "bi-directional affinity" in a load-balancing environment. Bi-directional affinity ensures that requests from external clients and corresponding responses from internal servers are processed by the same external network interface server. More particularly, the present invention generates a list of criteria that is surveyed during load balancing to ensure that the data response from the internal server is accepted by the same external network interface server that accepted and processed the data request.

The present invention comprises a new network load balancing/external network interface node for use in a system including multiple network load balancing/external network interface nodes. The network load balancing/external network interface ensures bi-directional load balancing affinity with regard to requests from external clients and corresponding responses from internal network servers. During the load-balancing process, an external network load balancing adapter executes a load-balancing algorithm to determine whether a received client request is accepted by the network load balancing/external network interface node. After server selection, an external network interface utility processes the received client request and maintains state information associated with the received client request. Thereafter, the client request is routed to an internal network server that processes the request and responds by routing a message to the internal load balancing adapter.

After receiving the response message, an internal network load balancing adapter executes either a default load-balancing algorithm or a complementary load-balancing algorithm to determine whether a received client request is accepted by the network load balancing/external network interface node. The default load-balancing algorithm can be any acceptable load-balancing algorithm adopted by the internal network adapters. The complementary load-balancing algorithm, however, ensures that the same network load balancing/external network interface node accepts a response from an internal network server corresponding to the received client request. In one embodiment of the invention, the list of criteria includes internal network source addresses for which the complementary load-balancing algorithm is selectively invoked.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF ILLUSTRATIVE EMBODIMENTS

In some situations, it is beneficial if the same server in a cluster processing a data request from an external client also processes a data response from a published server. It can be seen that there is a need for a method for effectuating "bi-directional affinity" such that a data response from a published server is always processed by the same server that processed the initial data request.

Figure 1:
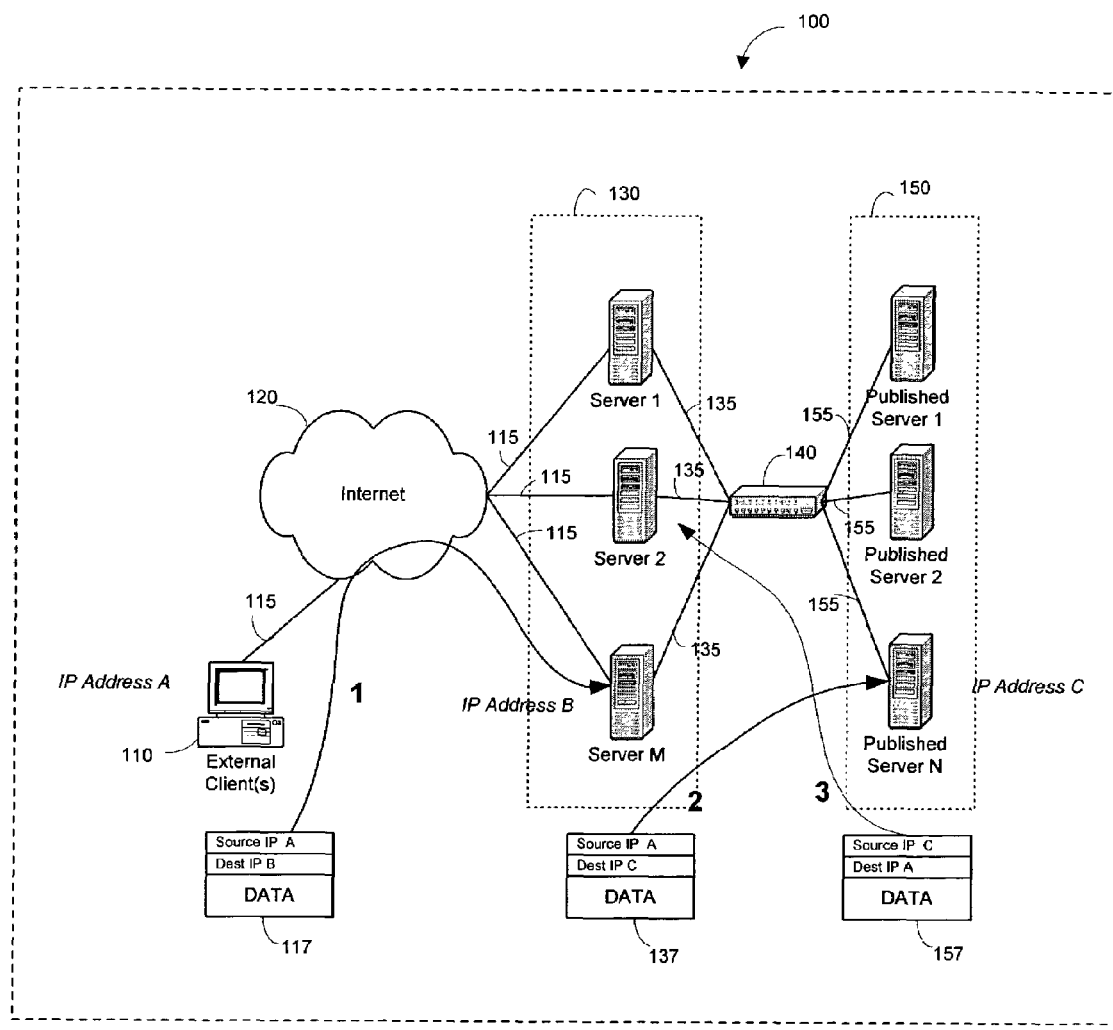
FIG. 1 is a schematic diagram of a computer network of the prior art illustrating a technique for load balancing a cluster of servers.
Figure 2:
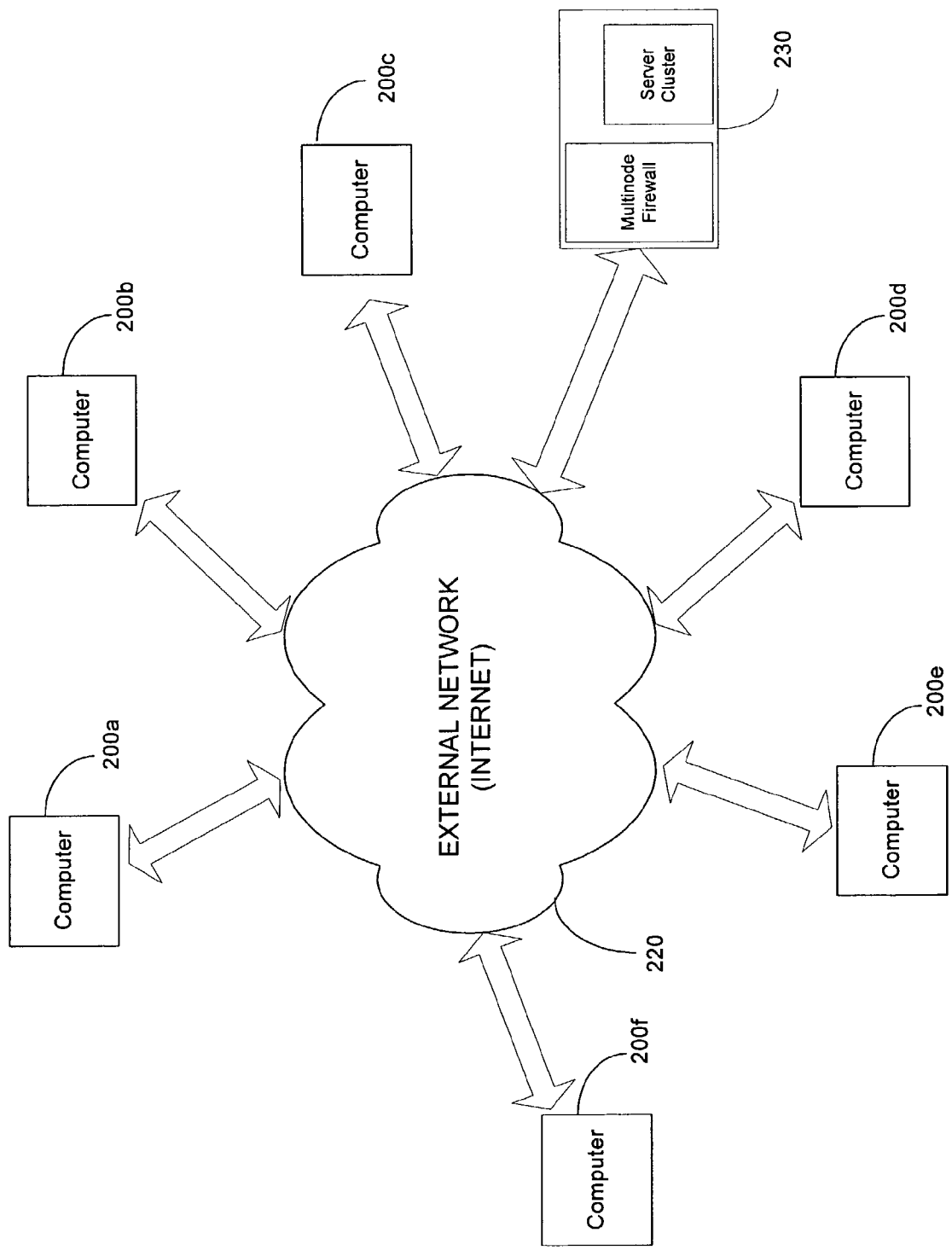
FIG. 2 is a schematic diagram of a networked computer system in which aspects of the present invention and/or portions thereof may be incorporated.

In an embodiment of the present invention, a bi-directional affinity load-balancing technique comprises server communication system software executed within a server computer operating environment such as the one depicted in FIG. 2, and in particular one that is configured to support potentially hundreds of thousands of concurrent network connections and data requests. Such a computing environment is potentially present in popular website server configurations that exist today. FIG. 2 illustratively depicts an example of a suitable operating environment within which the invention is implemented. The example network includes several computers 200*a-f* communicating with one another over a network 220, represented as a cloud. Network 220 may include any of many well-known components, such as routers, gateways, hubs, etc. and may allow computers 200*a-f* to communicate via wired and/or wireless media. The example network also includes a firewall protected server cluster 230 connected to network 220.

The invention is operational with numerous other general-purpose or special-purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like, either alone or in combination.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
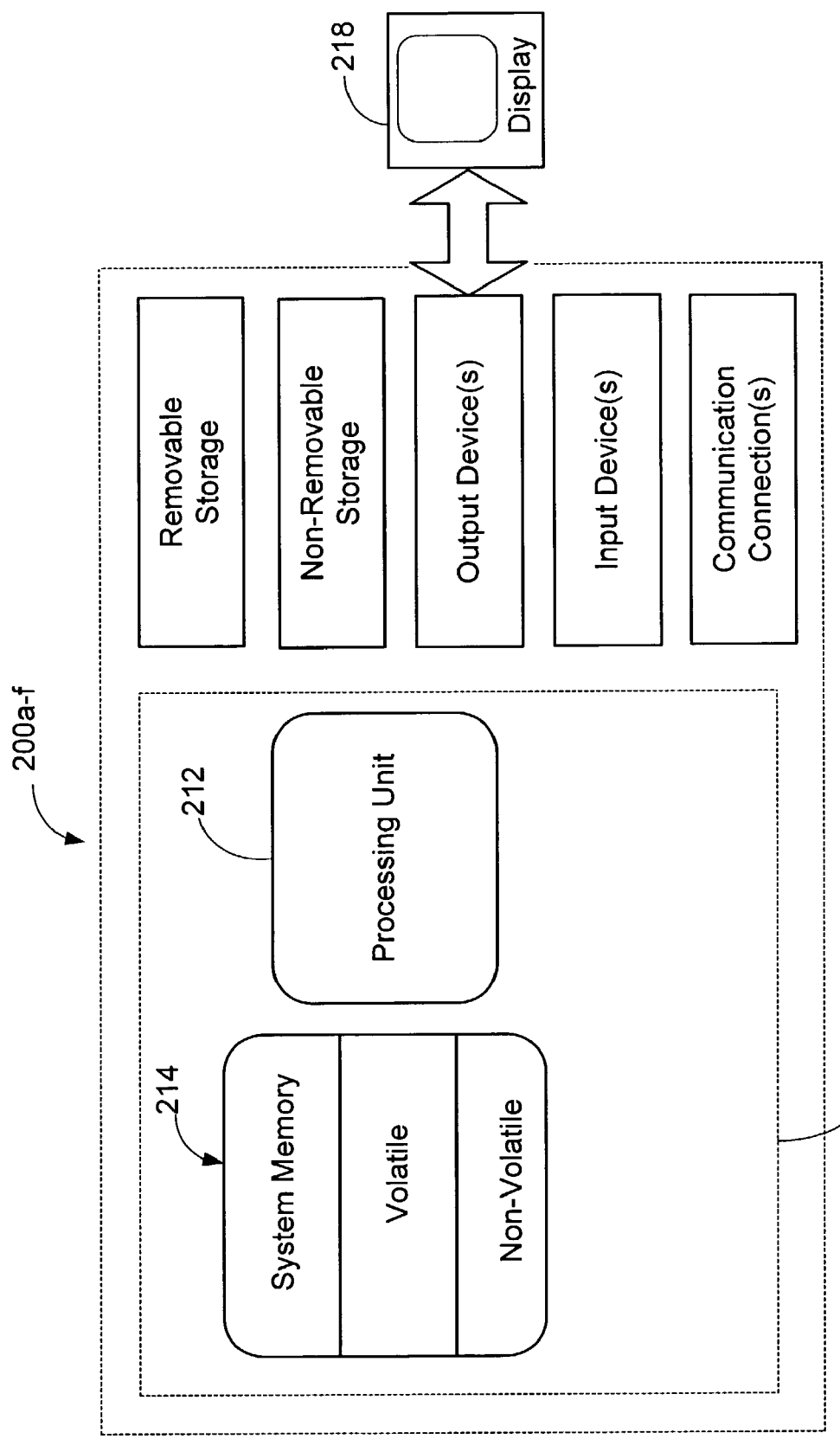
FIG. 3 is a block diagram of a general purpose computer in which aspects of the present invention and/or portions thereof may be incorporated.

Referring to FIG. 3, an example of a basic configuration for a load-balancing external network interface computer on which the invention described herein may be implemented is shown. In its most basic configuration, computers 200*a-f* typically include at least one processing unit 212 and memory 214. Depending on the exact configuration and type of the computer, the memory 214 may be volatile (such as RAM), non-volatile (such as ROM or flash memory) or some combination of the two. This most basic configuration is illustrated in FIG. 3 by dashed line 210. Additionally, the computer may also have additional features/functionality. For example, computers 200a-f may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by computers 200a-f. Any such computer storage media may be part of computers 200a-f.

Computers 200a-f may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media. Computers 200a-f may also have input devices such as a keyboard, mouse, pen, voice input device, touch input device, etc. Output devices such as a display 218, speakers, a printer, etc. may also be included. All these devices are well known in the art and need not be discussed at length here.

Figure 4A:
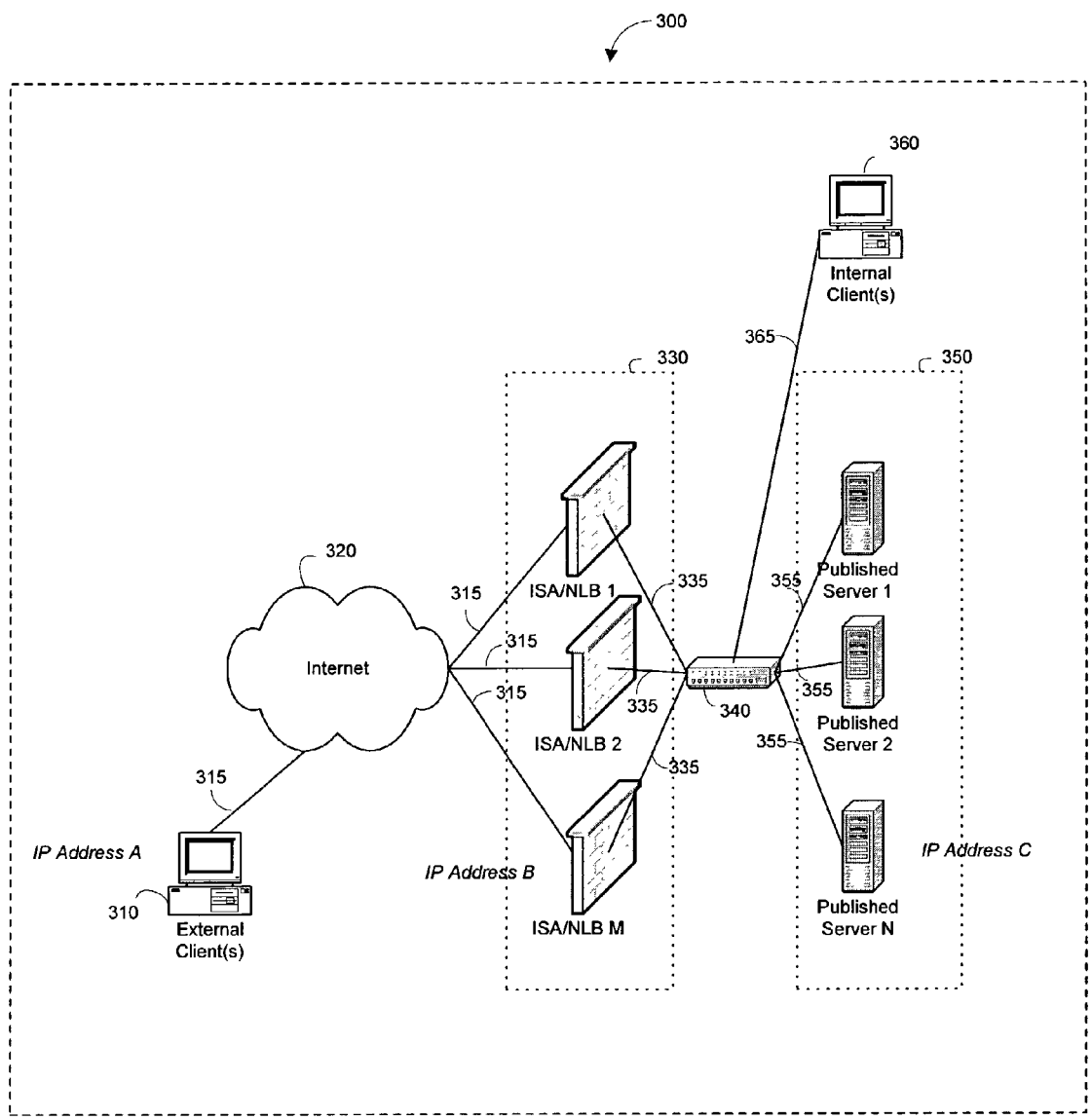
FIGS. 4*a-e* are schematic diagrams of a computer network illustrating a technique for load balancing a cluster of servers in accordance with one embodiment of the present invention.

Having described an exemplary computing environment for executing a method for load balancing interfaces in a multi-node network embodying the present invention, attention is directed to FIGS. 4a-e that depict an exemplary computer network application environment within which the present invention is practiced. As shown in FIG. 4a, networked computer system 300 includes one or more external client computers 310 connected via data links 315 and Internet 320 to a cluster of M servers 330 (referenced as ISA/NLB 1, ISA/NLB 2 and ISA/NLB M). Data links 315 comprise any appropriate data link, for example, a local area network or a wide area network. Various data links are employed in alternative embodiments of the invention. The cluster of servers 330 is also connected, via data links 335 and 355 and a router 340, to a series of N published servers 350 (referenced as Published Server 1, Published Server 2 and Published Server N). Published servers 350 comprise any appropriate server accessible for the purpose of providing content, for example, a website host.

In an embodiment of the present invention as shown in FIG. 4a, the networked computer system 300 includes one or more internal client computers 360 connected to the cluster of servers 330 and the series of published servers 350 via data links 335, 355 and 365 and router 340. As will be explained further herein below, external clients 310 and internal clients 360 request/receive data information from published servers 350 by sending/receiving a request/response message. In order to manage the traffic associated with data requests and responses, computer network system 300 includes a technique for load balancing data traffic across the cluster of servers 330.

In an embodiment of the present invention, each server within the cluster 330 functions as a firewall simultaneously acting as a secure gateway to Internet 320 for internal clients 360 and protecting against intrusions from external clients 310. An implementation example of such a firewall is Microsoft's Internet Security and Acceleration Server also referred to as "ISA" (a product of Microsoft Corp. of Redmond, Wash.). To load balance the data traffic amongst the cluster of ISA servers 330, each ISA server executes Microsoft's NLB application as a network driver. As described above, the NLB drivers, executing concurrently on each ISA server, communicate with each other to monitor the availability of each ISA server and to determine mutually which ISA server in the cluster accepts the application request.

Figure 5:
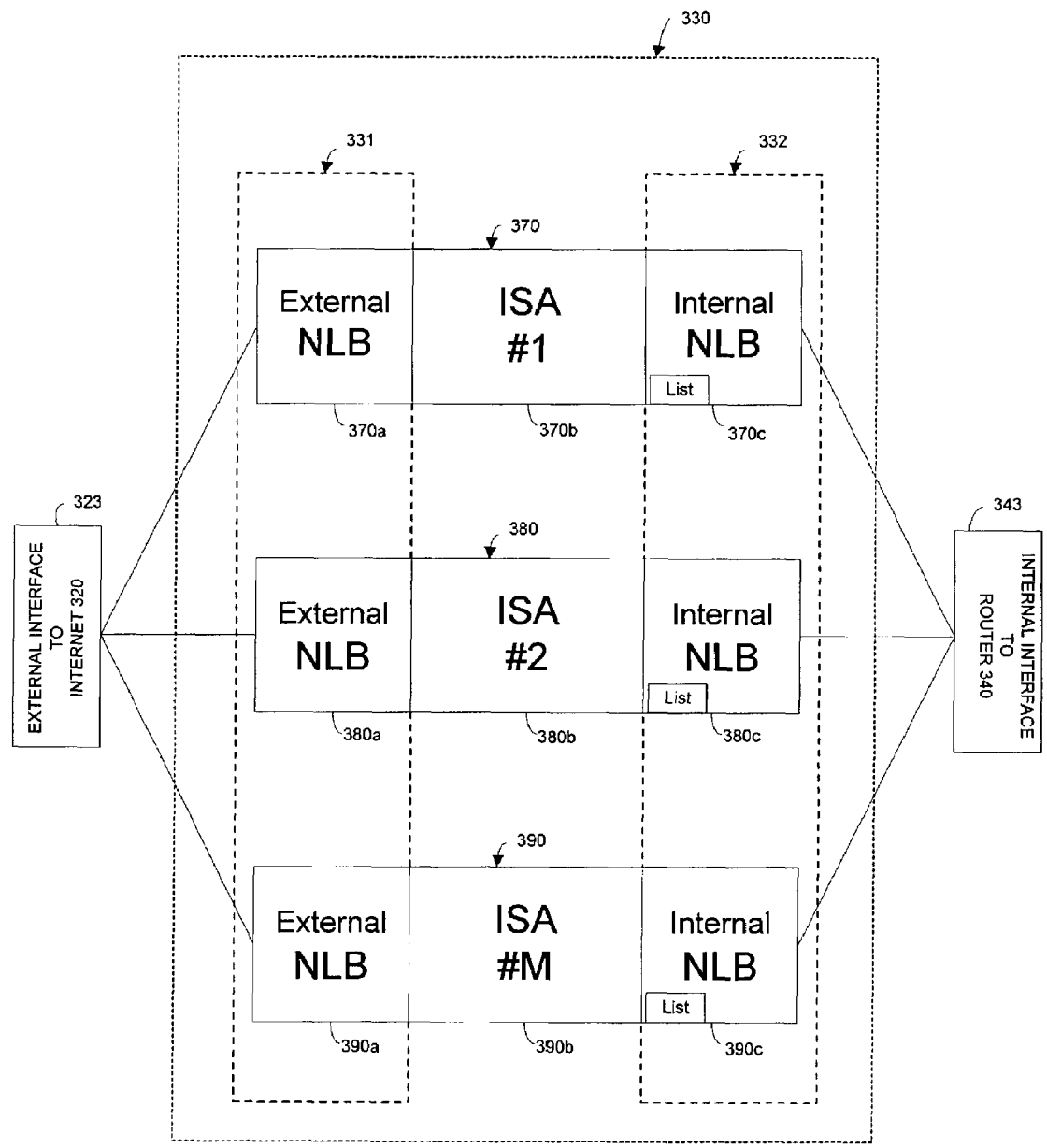
FIG. 5 is a block diagram of a multiple network load balancing/external network interface nodes in which aspects of the present invention and/or portions thereof may be incorporated.

Turning briefly to FIG. 5, an exemplary cluster 330 of ISA/NLB servers is schematically depicted having a plurality of M servers (referenced as ISA/NLB #1 370, ISA/NLB #2 380 and ISA/NLB #M 390). Each ISA server uses an NLB to balance traffic on the external interfaces 323 and internal interfaces 343 of the ISA server cluster 330. During the load-balancing process, incoming data requests from external clients 310 via Internet 320 and outgoing data requests from internal clients 360 via router 340 are routed to the appropriate ISA server. The process of determining the appropriate ISA server is performed by the NLB, however, any appropriate load-balancing application can be used. The goal of the load-balancing process is to balance incoming and outgoing data requests amongst the servers in the ISA cluster 330. According to an embodiment of the invention, data responses from the published server 350, however, are not balanced amongst the ISA servers 330, but rather incorporate bi-directional affinity that ensures responses are routed to the same ISA server that processed the external request.

With reference to FIG. 5, each server includes an external network load balancing adapter 370a, 380a and 390a that executes a load-balancing algorithm to determine whether a received client request is accepted by one of the servers 370b, 380b or 390b. Similarly, each server includes an internal network load balancing adapter 370c, 380c, and 390c that executes a load-balancing algorithm ensuring that the server 370b, 380b or 390b that accepts a response from the published server corresponds to the same server that accepted the external client request. As will be explained further herein below, each internal network load balancing adapter 370c, 380c, and 390c comprises a default load-balancing algorithm, a complementary load-balancing algorithm and a list of criteria.

According to the present invention, a mapping of NLB adapters is used to provide global load balancing state for all external and internal load balancing adapters participating in the bi-directional affinity process. In one embodiment of the present invention, external load balancing adapters are grouped in an external NLB cluster and internal load balancing adapters are grouped in an internal NLB cluster. With reference to server cluster 330 in FIG. 5, external load balancing adapters 370a, 380a and 390a are grouped in an external NLB cluster 331. Similarly, internal load balancing adapters 370c, 380c and 390c are grouped in an internal NLB cluster 332. According to the present invention, external NLB cluster 331 and internal NLB cluster 332 use the same global load balancing state to implement bi-directional affinity. Using the same global load balancing state, along with appropriate use of the complementary algorithm, ensures that request messages and response messages are processed by the same network interface server.

Figure 4B:
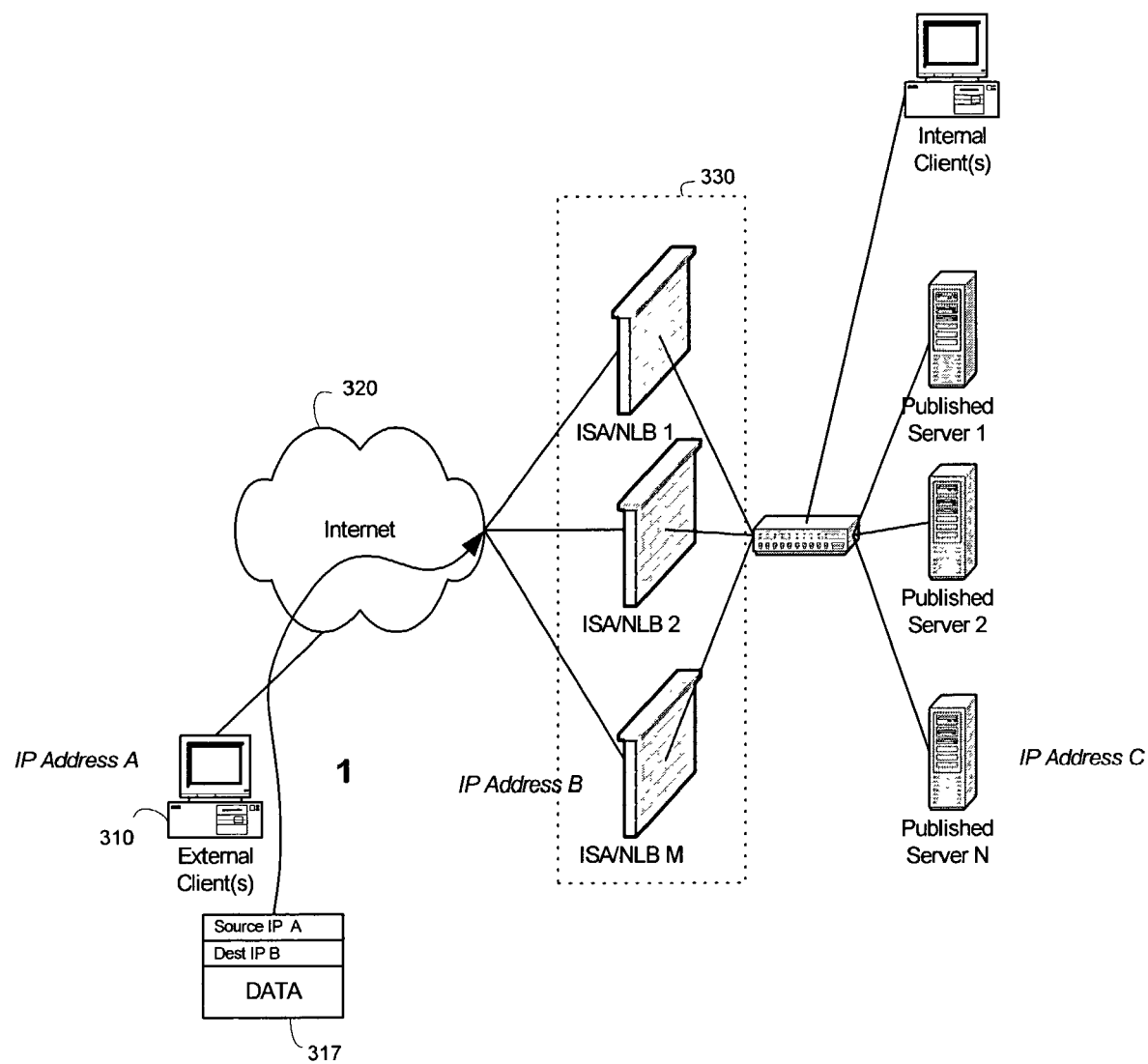

Turning to FIG. 4b, when a connection request is initiated by external client 310 to a published server behind the ISA firewall 330, the external client 310 first connects to the external interface of ISA/NLB cluster 330 by forwarding a request message 317. In this example, data request message 317, having a source IP address of IP Address A and a destination IP address of IP Address B, follows message path 1. When message request 317 arrives at the external interface of the cluster 330, the external NLB adapters 370a, 380a and 390a (as shown in FIG. 5) execute a server selection algorithm based upon the source or destination IP addresses (i.e., IP Address A or IP Address B) as a method for load balancing incoming data requests. Alternatively, the server selection algorithm uses any part of the communication header, alone or in combination, as a method for load balancing. In one embodiment of the invention, NLB adapters 370a, 380a and 390a (as shown in FIG. 5) execute the server selection algorithm using the source IP address. The result of the server selection algorithm determines which ISA server 370b, 380b or 390b (as shown in FIG. 5) in the ISA server cluster 330 accepts request message 317. In the example of FIG. 4b, the server selection algorithm determines that ISA/NLB M accepts message 317.

Figure 4C:
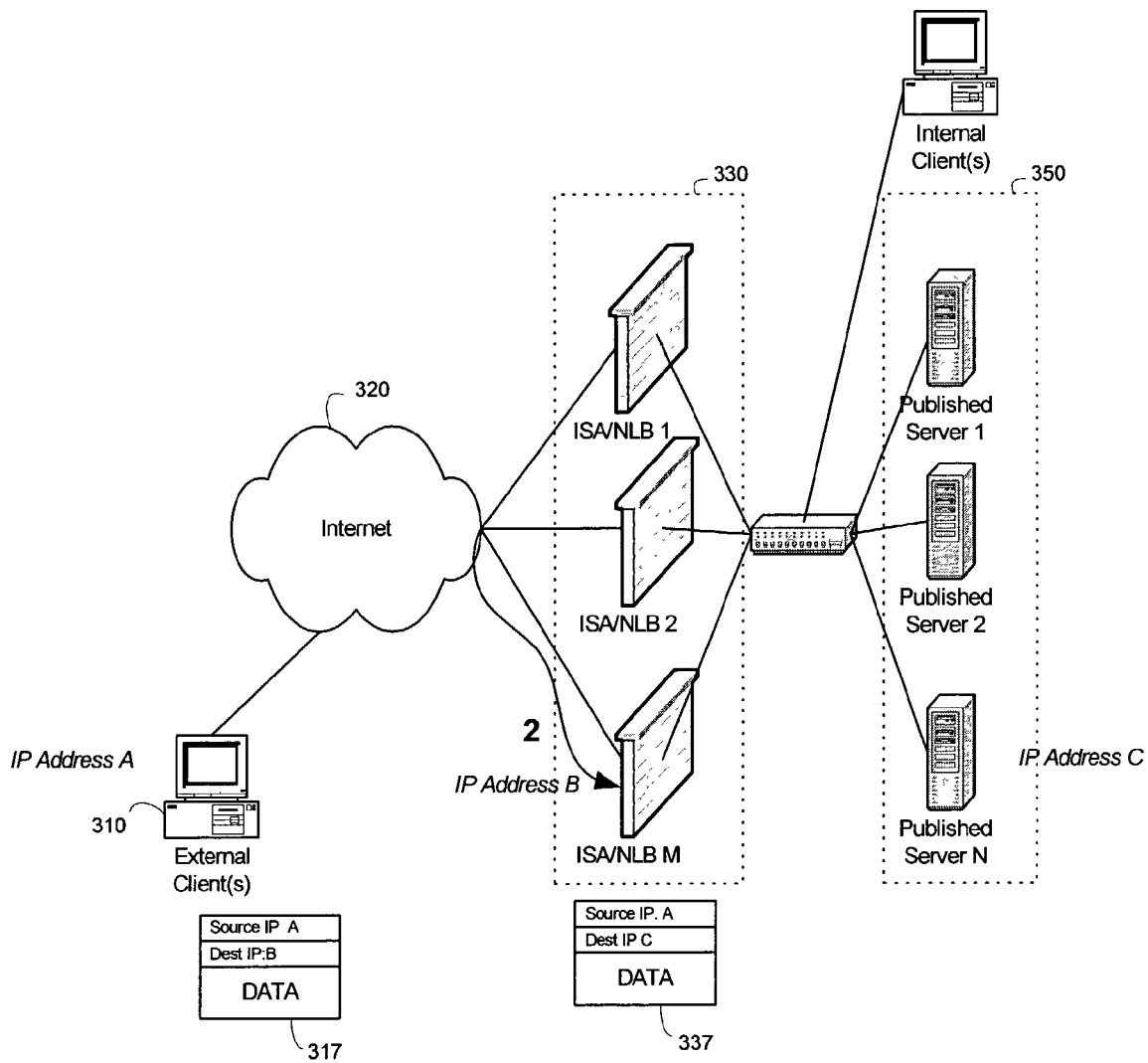

Turning to FIG. 4c, data request message 317 is routed to ISA/NLB M along message path 2. After determining which published server in the series of published servers 350 should receive message request 317, ISA/NLB M routes the request message 337 to the appropriate published server by effectively translating the destination IP address to that of the appropriate published server. In the example, data message 337 translates the destination IP address from IP Address B to IP Address C. Before routing data message 337 to Published Server N (i.e., IP Address C), ISA/NLB M saves the state information associated with the external client request.

Figure 4D:
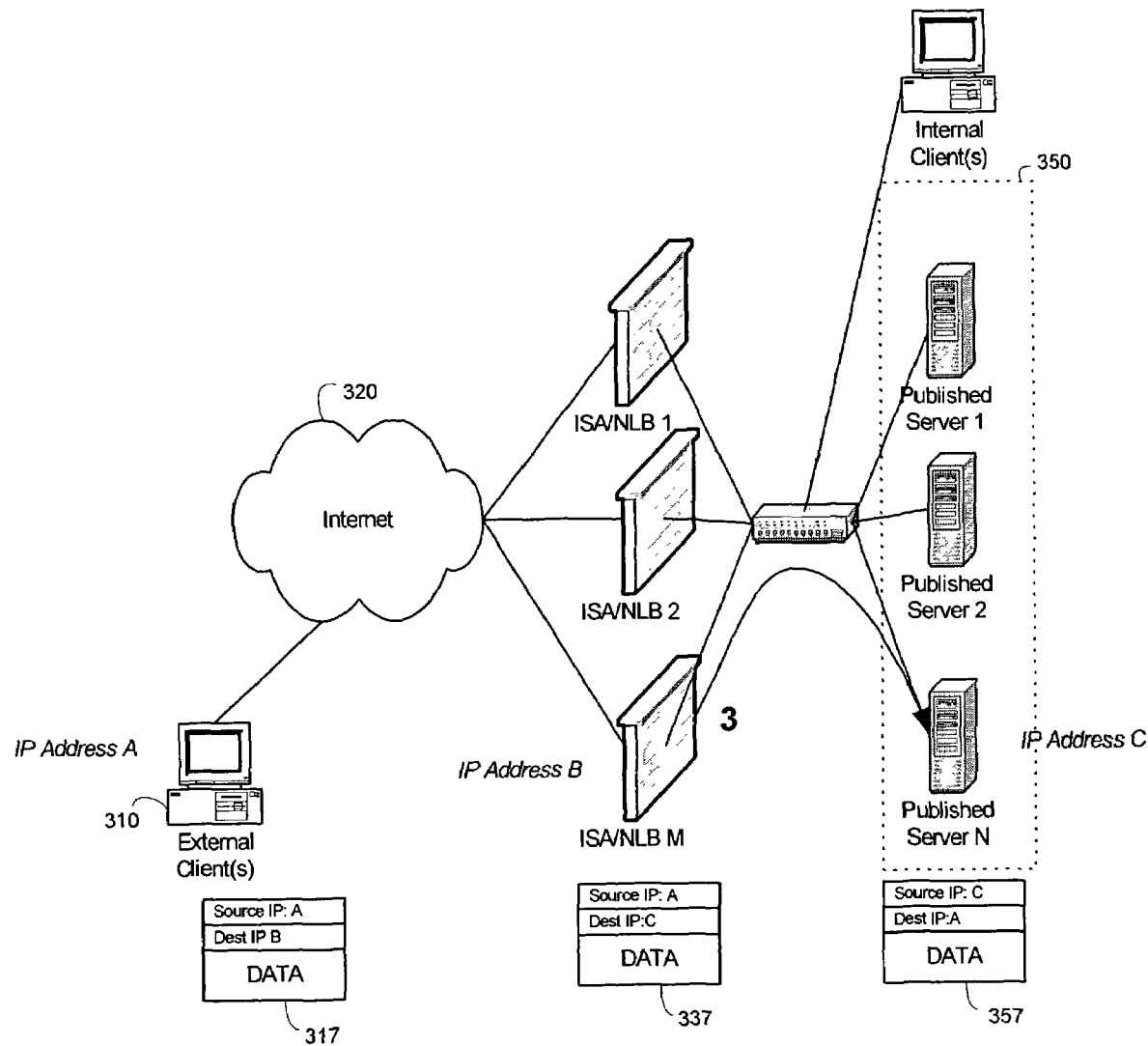

Turning to FIG. 4d, ISA/NLB M routes data request message 337 to Published Server N having IP Address C along message path 3. When Published Server N responds to the request, it first swaps the source and destination information stored in data message 357. As depicted in FIG. 4d, data response message 357 swaps the source and destination IP addresses such that the source address changes to IP Address C (i.e., Published Server N) and the destination address changes to IP Address A (i.e., external client 310).

Figure 4E:
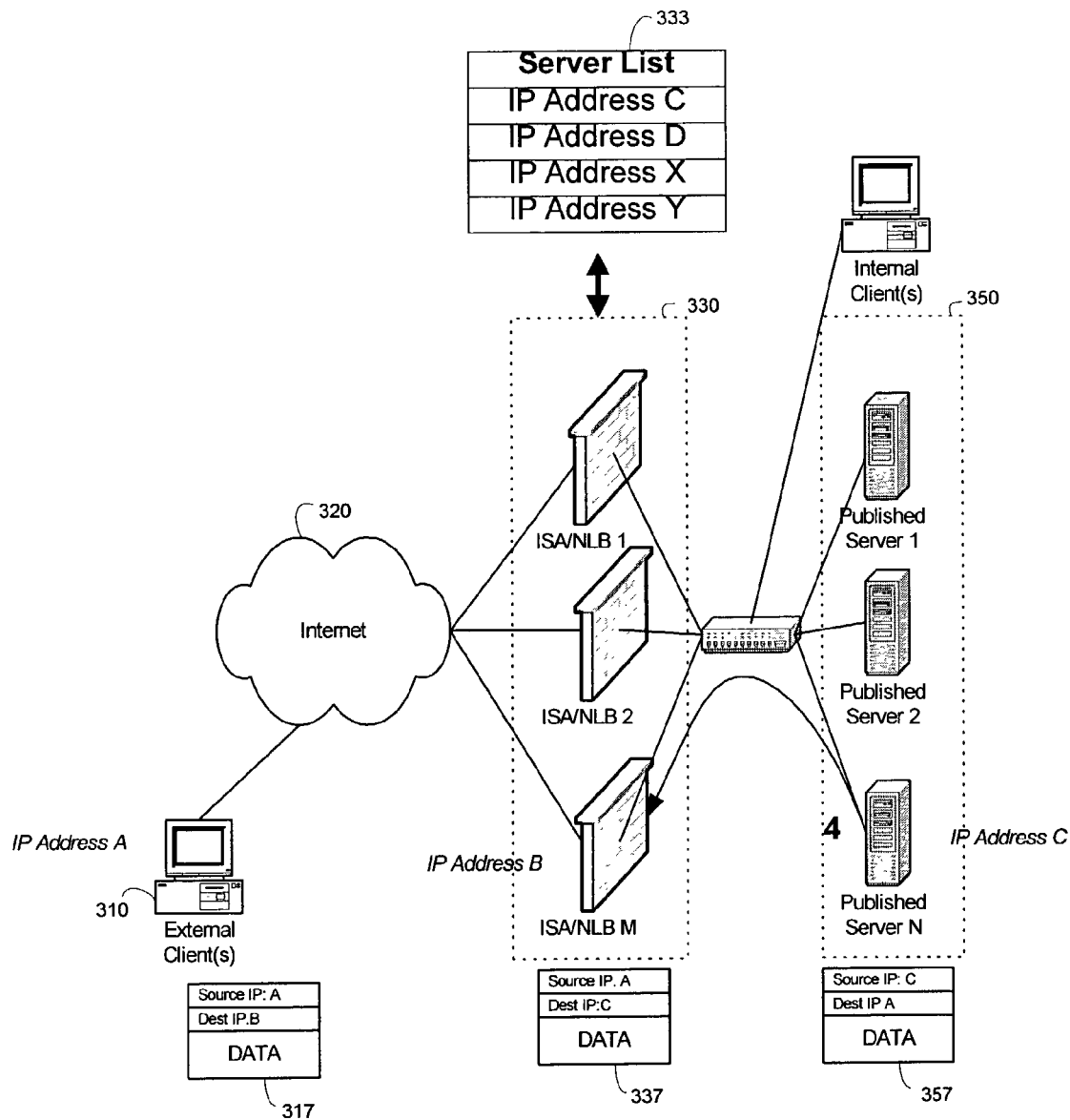

Next, as depicted in FIG. 4e, data response message 357 is routed back through the network and router to the cluster of NLB/ISA servers 330. In order to preserve bi-directional affinity, when response message 357 arrives at the internal interface of server cluster 330, NLB first determines whether the source IP address for response message 357 is a member of a list 333 of criteria provided to NLB by ISA. The list 333 of criteria contains network source addresses for all published servers that select to have the data response message routed to the same NLB/ISA server that accepted and processed the client request. In one embodiment of the present invention, a network administrator populates list 333 with the IP addresses of those published servers for which the NLB/ISA servers 330 ensure bi-directional affinity. Alternatively, list 333 may include destination network MAC addresses or any other criteria in a network packet that uniquely identifies components of the system for which to invoke the complementary load-balancing algorithm. In another embodiment of the present invention, the ISA 370b, 380b or 390b statically configures the internal NLB 370c, 380c or 390c, on a per-adapter basis, to routinely invoke bi-directional affinity for messages arriving on the internal adapter side. In yet another embodiment of the present invention, criteria relating to data request messages (i.e., inbound packets) are individually assessed by the ISA 370b, 380b or 390b which, in turn, directs the NLB 370c, 380c or 390c to invoke either the default or complementary load-balancing algorithm.

According to one aspect of the exemplary load-balancing technique, if the published server address is a member of the list 333 or the internal NLB is statically configured to perform bi-directional affinity, NLB executes a complementary server selection algorithm to determine which NLB/ISA server accepts response message 357. In one embodiment of the present invention, the complementary server selection algorithm executes based upon the destination address (i.e., the IP address of the client computer 310) in response message 357, rather than the source IP address. Alternatively, if the published server address is not a member of the list 333 and the internal NLB is not statically configured to perform bi-directional affinity, NLB executes a default server selection algorithm to determine which NLB/ISA server accepts response message 357. In one embodiment of the invention, the default algorithm executes based upon the source address.

With reference to FIG. 4e, a comparison of the source IP address in response data message 357 (i.e., IP Address C) with the network addresses in the list 333 reveals that IP Address C is on the list 333. Consequently, the NLB executes the complementary server selection algorithm upon the destination IP address (i.e., IP Address A) instead of executing the default algorithm upon the source IP address (i.e., IP Address C). Executing the server selection algorithm based upon IP Address A ensures that response message 357 is accepted by ISA/NLB M, the same ISA server that accepted and processed client request 317. One benefit of utilizing the same ISA server to process requests and responses is that stateful inspection of the data request processed is made possible.

Figure 6:
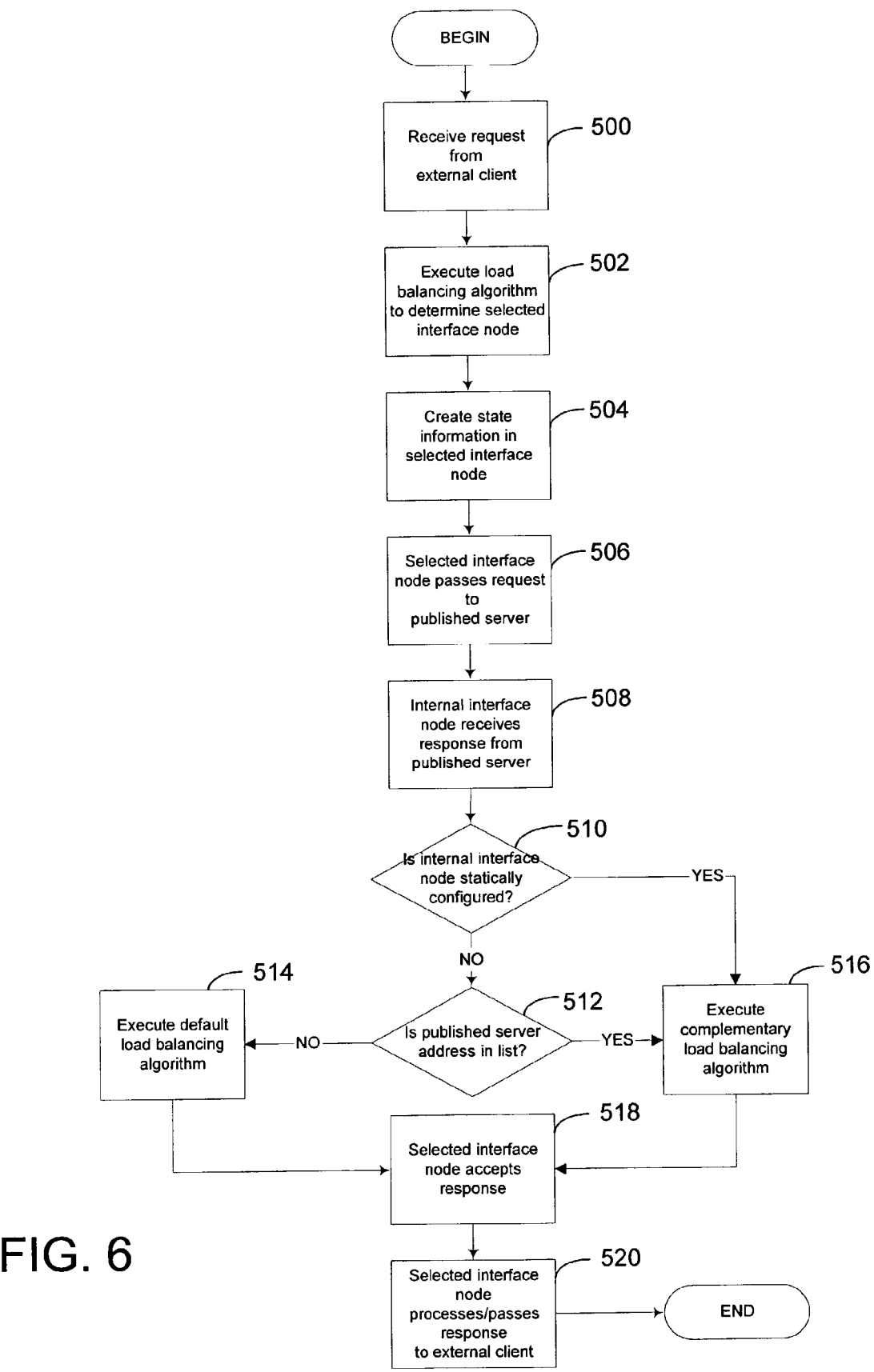
FIG. 6 is a flowchart depicting steps performed by a multi-node external network interface incorporating bi-directional affinity in load balancing.

Having described structures that support an exemplary load-balancing technique of bi-directional affinity embodying the present invention, attention is now directed to FIG. 6 that depicts a set of steps performed by a multi-node external network interface incorporating bi-directional affinity in load balancing. The steps described herein below are exemplary. As those skilled in the art will readily appreciate, the present invention can be carried out in a variety of manners and the steps described herein below can be rearranged and modified in accordance with alternative embodiments of the present invention.

The procedure begins at step 500 where the external network interface receives a request from an external client 310. Request message 317 includes a source IP address, a destination IP address and other data. In response to receipt of the message, during step 502 a load-balancing algorithm is executed to select which interface node will process the data request. For example, in an embodiment of the present invention, the external network interface adapters apply a modulo algorithm on a hash of the source IP address to select the interface node. Thereafter, at step 504, the selected interface node creates state information for request message 317. At step 506, request message 337 is passed to the published server by the selected interface node.

After receiving request message 337, published server 350 sends response message 357 to the internal network interface at step 508. Thereafter, at steps 510 and 512, a determination is made whether to invoke the default or complementary load-balancing algorithm. At step 510, the internal interface node determines whether it is statically configured to always invoke bi-directional affinity. If the internal interface node has not been configured as such, at step 512, list 333 is examined to determine if the address of the published server 350 is on the list 333. If the address is not on the list 333 of criteria that includes internal network source addresses, then control passes to step 514. At step 514, the internal network interface adapters execute a default load-balancing algorithm to select an interface node. In a particular example of default load balancing, the internal network interface adapters apply a modulo algorithm on a hash of the source IP address to select the interface node. The default load-balancing algorithm can be any acceptable load-balancing algorithm adopted by the internal network adapters.

Alternatively, if the internal interface node is statically configured to always invoke bi-directional affinity as determined in step 510 or the address of the published server 350 is on the list 333 of criteria that includes internal network source addresses as determined in step 512, then control passes to step 516. At step 516, the internal network interface executes a complementary load-balancing algorithm to select an interface node. Execution of a complementary load-balancing algorithm ensures that response message 357 is accepted by the same interface node that processed request message 317. In a particular example of complementary load balancing, the internal network interface adapters apply a modulo algorithm on a hash of the destination IP address to select the interface node.

At step 518, the interface node selected during execution of the load-balancing algorithm accepts response message 357. Thereafter at step 520, response message 357 is processed by the selected interface node and passed to external client computer 310.

Figure 7:
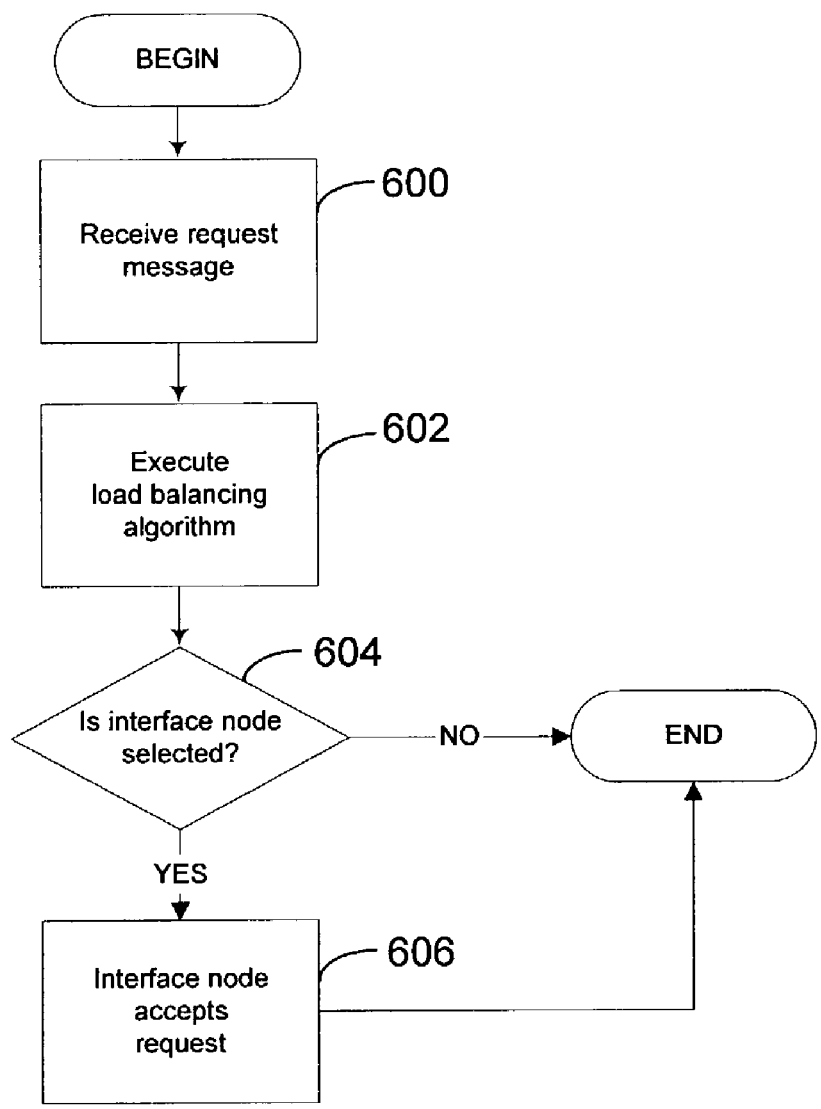
FIG. 7 is a flowchart depicting steps performed when an external interface node receives a request message from an external client in accordance with one embodiment of the present invention.

Attention is now directed to FIG. 7 that depicts a set of steps performed by the external interface nodes in the server cluster after receiving a request message from an external client. The steps described herein below are exemplary.

The procedure begins at step 600 wherein the external interface node adapters receive a message request 317 from external client 310. Thereafter, at step 602 the external interface node adapters execute a load-balancing algorithm to determine whether the node is selected to accept request message 317. The load-balancing algorithm can be any acceptable load-balancing algorithm adopted by the external network adapters. In a particular example of load balancing, the external network interface adapters apply a modulo algorithm on a hash of the source IP address to select the interface node. At step 604, if the external interface node is selected, then control passes to step 606. At step 606, the external interface node accepts request message 317 and the process ends.

Figure 8:
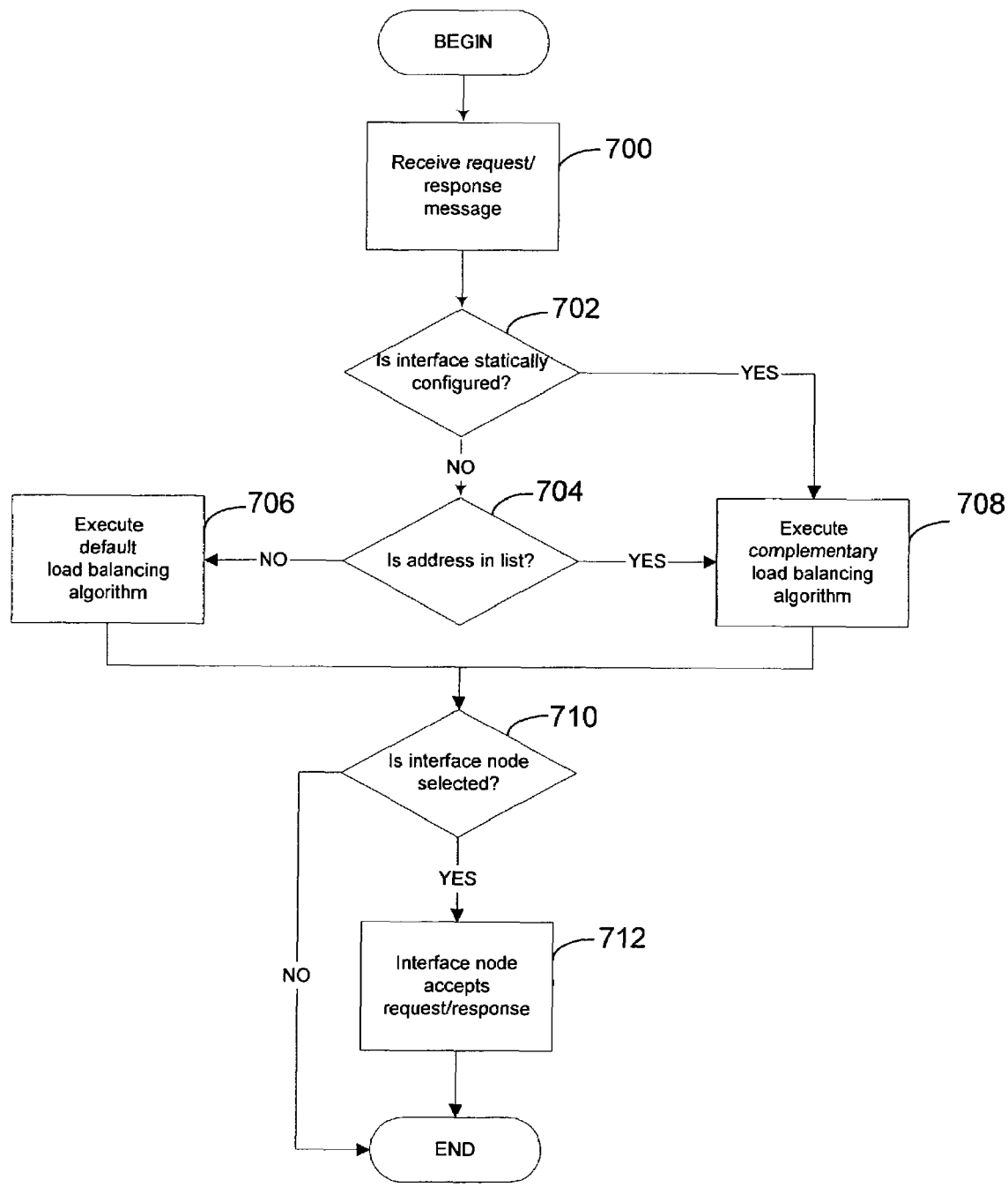
FIG. 8 is a flowchart depicting steps performed when an internal interface node receives a request/response message from an internal client/server in accordance with one embodiment of the present invention.

Attention is now directed to FIG. 8 that depicts a set of steps performed by the internal interface nodes in the server cluster after receiving a request/response message from an internal server. The steps described herein below are exemplary.

The procedure begins at step 700 wherein the internal interface node adapters receive a request/response message from an internal client 360 or an internal server 350. At steps 702 and 704, a determination is made whether to invoke the default or complementary load-balancing algorithm. At step 702, the internal interface determines whether it is statically configured to always invoke bi-directional affinity. If the internal interface has not been configured as such, at step 704, list 333 is examined to determine if the address of internal client 360 or internal server 350 is on the list 333. If the address is not on the list 333 of internal network source addresses, then control passes to step 706. At step 706, the internal network interface executes a default load-balancing algorithm to select an interface node.

Alternatively, if the internal interface node is statically configured to always invoke bi-directional affinity as determined in step 702 or the address of internal server 350 or internal client 360 is on the list 333 of internal network source addresses, then control passes to step 708. At step 708, the internal network interface executes a complementary load-balancing algorithm to select an interface node. Execution of a complementary load-balancing algorithm ensures that response message 357 from internal server 350 is accepted by the same interface node that accepted and processed request message 317.

At step 710, if the internal interface node is selected, then control passes to step 712. At step 712, the internal interface node accepts the request/response message and the process ends.

Illustrative embodiments of the present invention and certain variations thereof have been provided in the Figures and accompanying written description. The present invention is not intended to be limited to the disclosed embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A network load-balancing/external network interface node providing bi-directional load-balancing affinity, the network load-balancing /external network interface node comprising:

an external network load-balancing adapter operable to receive a request from an external client and to process the request via a first load-balancing algorithm, the first load-balancing algorithm determining acceptance of the request, the external network load-balancing adapter being one of a group of external network load-balancing adapters forming an external network load-balancing cluster;

an external network interface utility coupled to the external network load balancing adapter and operable to process the request, if accepted, the processing including:

maintaining state information associated with the request, the state information being part of a global load-balancing state associated with the external network load-balancing cluster and with an internal network load-balancing cluster, the global load-balancing state including a list of network source addresses of participating servers of a plurality of internal servers, the participating servers providing the bi-directional load-balancing affinity, and routing the request to one of the participating servers of the plurality of internal servers; and an internal network load-balancing adapter associated with the external network load balancing adapter and operable to receive a response from the one of the participating servers of the plurality of internal servers and to process the response via a second load-balancing algorithm, the second load-balancing algorithm determining acceptance of the response based on the global load-balancing state and a modulo algorithm on a hash of an address of the response, the internal network load-balancing adapter being one of a group of internal network load-balancing adapters forming the internal network load-balancing cluster, wherein the external network load-balancing cluster and the internal network load-balancing cluster form a network load-balancing cluster operable to function as a secure gateway to one or more internal clients and operable to protect against intrusions from a plurality of external clients including the external client.

2. The network load balancing/external network interface node of claim 1 wherein the first load-balancing algorithm includes as an input, an external address of the client.

3. The network load balancing/external network interface node of claim 2 wherein the first load-balancing algorithm further includes as the input, a port identified in the request.

4. The network load balancing/external network interface node of claim 1 wherein the list of network source addresses of participating servers of a plurality of internal servers is provided to the internal network load balancing adapter by the external network interface utility.

5. The network load balancing/external network interface node of claim 1 wherein the global load-balancing state comprises a list of destination network MAC addresses.

6. The network load balancing/external network interface node of claim 1 wherein the external network interface utility includes a firewall.

7. The network load balancing/external network interface node of claim 1 wherein the first load-balancing algorithm and the second load-balancing algorithm are each a complementary load-balancing algorithm.

8. The network load balancing/external network interface node of claim 1 embodied as computer-executable instructions on a computer-readable media.

9. The network load balancing/external network interface node of claim 1 implemented as a software-based device driver.

10. A method for establishing bi-directional load-balancing affinity via a load-balancing system between a plurality of internal servers and a plurality of external clients, the method comprising:

associating a plurality of load-balancing nodes to form a load-balancing cluster, wherein each node of the load-balancing cluster is operable to communicate with each other node of the load-balancing cluster;

maintaining global load-balancing state associated with the load-balancing cluster, the global load-balancing state including a list of network source addresses of participating servers of the plurality of internal servers, the participating servers providing the bi-directional load-balancing affinity;

first receiving, by the load-balancing system, a request from one of the plurality of external clients;

first selecting, based upon the global load-balancing state and a complementary load-balancing algorithm, a selected load-balancing node of the load-balancing cluster to accept the request;

routing, by the selected load-balancing node, the request to one of the participating servers of the plurality of internal servers;

second receiving, by the load-balancing system, a response from the one of the participating servers of the plurality of internal servers;

second selecting, based upon the global load-balancing state and upon the complementary load-balancing algorithm applying a modulo algorithm on a hash of an address of the response, the selected load-balancing node to accept the response; and passing, by the selected load-balancing node, the response to the one of the plurality of external clients, and wherein the load-balancing system is operable to function as a secure gateway to one or more internal clients and the plurality of internal servers and is operable to protect against intrusions from the plurality of external clients.

11. The method of claim 10 wherein the global load-balancing state includes mappings between ones of a plurality of external network load-balancing adapters and ones of a plurality of internal load-balancing adapters, the external network load-balancing adapters forming an external network load-balancing cluster, and the internal network load-balancing adapters forming an internal network load-balancing cluster, the external network load-balancing cluster and the internal network load-balancing cluster being a part of the load-balancing cluster.

12. The method of claim 10 embodied as computer-executable instructions on a computer-readable medium.

13. A bi-directional network load-balancing system comprising:

a plurality of load-balancing servers forming a load-balancing cluster and operable to inter-communicate and wherein each load-balancing server includes:

an external load-balancing adapter operable to communicate with a plurality of external clients, the external network load-balancing adapter being one of a group of external network load-balancing adapters forming an external network load-balancing cluster, and an internal load balancing adapter associated with the external load balancing adapter so as to form a pair of adapters and operable to communicate with a plurality of published internal servers, the internal network load-balancing adapter being one of a group of internal network load-balancing adapters forming an internal network load-balancing cluster, wherein the external network load-balancing cluster and the internal network load-balancing cluster comprise the network load-balancing cluster operable to function as a secure gateway to one or more internal clients and operable to protect against intrusions from the plurality of external clients;

global load-balancing state associated with the external network load-balancing cluster and with the internal network load-balancing cluster, the global load-balancing state including a list of network source addresses of participating servers of the plurality of published internal servers, the participating servers providing bi-directional load-balancing affinity;

a first grouping including each of the external load-balancing adapters of each of the plurality of load-balancing servers, the first grouping forming an external interface of the bi-directional network load-balancing system and comprising the external network load-balancing cluster, the external interface operable to receive requests from the plurality of external clients;

a second grouping including each of the internal load-balancing adapters of each of the plurality of load-balancing servers, the second grouping forming an internal interface of the bi-directional network load-balancing system and comprising the internal network load-balancing cluster, the internal interface operable to receive responses from the plurality of published internal servers; and a complimentary load-balancing algorithm usable to select one of the plurality of load-balancing servers to accept a request from one of the plurality of external clients upon receipt of the request by the external interface, and usable to select, based on the global load-balancing state and a modulo algorithm on a hash of an address of the response, the one of the plurality of load-balancing servers to accept a response upon receipt of the response by the internal interface, the response responsive to the request and from one of the participating servers of the plurality of published internal servers, so as to provide the bi-directional load-balancing affinity between the one of the plurality of external clients and the one of the participating servers of the plurality of published internal servers via the one of the plurality of load-balancing servers.

14. The system of claim 13 embodied as computer-executable instructions on a computer-readable medium.

15. The system of claim 13 wherein each of the internal load-balancing adapters of each of the plurality of load-balancing servers is operable to communicate with the one or more internal clients.

16. The system of claim 13 wherein each of the plurality of load-balancing servers further includes a firewall.

* * * * *

UNITED STATES PATENT AND TRADEMARK OFFICE
CERTIFICATE OF CORRECTION

PATENT NO. : 7,380,002 B2  Page 1 of 1
APPLICATION NO. : 10/186899
DATED : May 27, 2008
INVENTOR(S) : Sean B. House et al.

It is certified that error appears in the above-identified patent and that said Letters Patent is hereby corrected as shown below:

In column 10, line 30, in Claim 1, delete "load-balancing /external network" and insert -- load-balancing/external network --, therefor.

In column 11, line 38, in Claim 10, delete "cluster," and insert -- cluster --, therefor.

Signed and Sealed this
Twelfth Day of April, 2011

David J. Kappos
*Director of the United States Patent and Trademark Office*